(12) United States Patent
Forehand et al.

(10) Patent No.: US 9,489,508 B2
(45) Date of Patent: Nov. 8, 2016

(54) DEVICE FUNCTIONALITY ACCESS CONTROL USING UNIQUE DEVICE CREDENTIALS

(71) Applicant: Seagate Technology LLC, Cupertino, CA (US)

(72) Inventors: Monty A. Forehand, Loveland, CO (US); Manuel A. Offenberg, San Francisco, CA (US); Christopher J. DeMattio, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/540,784

(22) Filed: Nov. 13, 2014

(65) Prior Publication Data

US 2016/0140334 A1 May 19, 2016

(51) Int. Cl.
G06F 21/44 (2013.01)
G06F 21/80 (2013.01)
H04L 29/06 (2006.01)
H04L 9/06 (2006.01)

(52) U.S. Cl.
CPC ............. *G06F 21/44* (2013.01); *G06F 21/80* (2013.01); *H04L 63/0853* (2013.01); *G06F 2221/2107* (2013.01); *H04L 9/0643* (2013.01)

(58) Field of Classification Search
CPC ........... G06F 21/80; G06F 2221/2107; H04L 63/0853; H04L 9/0643
See application file for complete search history.

(56) References Cited

U.S. PATENT DOCUMENTS

| | | |
|---|---|---|
| 5,970,147 A | 10/1999 | Davis |
| 6,760,441 B1 | 7/2004 | Ellison et al. |
| 7,028,185 B2 | 4/2006 | Wheeler et al. |
| 7,107,462 B2 | 9/2006 | Fransdonk |
| 7,139,915 B2 | 11/2006 | DeTreville |
| 7,313,690 B2 | 12/2007 | Miller |
| 7,325,134 B2 | 1/2008 | Fascenda |
| 7,360,096 B2 | 4/2008 | Bracewell et al. |
| 7,535,249 B1 * | 5/2009 | Knapp ................. G06F 21/572 326/8 |
| 7,818,574 B2 | 10/2010 | Fayad et al. |
| 7,818,587 B2 | 10/2010 | Drew et al. |
| 8,155,679 B2 * | 4/2012 | Levi ....................... G06Q 30/02 455/414.1 |

(Continued)

FOREIGN PATENT DOCUMENTS

EP 1394654 3/2004

OTHER PUBLICATIONS

Cesena E, Ramunno G, Vernizzi D. Secure storage using a sealing proxy. InProceedings of the 1st European Workshop on System Security Mar. 31, 2008 (pp. 27-34). ACM.*

(Continued)

*Primary Examiner* — James Turchen
(74) *Attorney, Agent, or Firm* — Hall Estill Attorneys at Law

(57) ABSTRACT

Apparatus and method for controlling access to protected functionality of a data storage device. In some embodiments, a plurality of identification (ID) values associated with a data storage device are combined to form a combined ID value. The combined ID value is cryptographically processed using a secret symmetric encryption key in combination with a hash function or a key derivation function to generate a unique device credential for the data storage device. The unique device credential is used as an input to a selected cryptographic function to control access to a protected function of the data storage device.

15 Claims, 9 Drawing Sheets

(56) References Cited

U.S. PATENT DOCUMENTS

| | | | |
|---|---|---|---|
| 8,447,977 B2 | 5/2013 | Slick et al. | |
| 8,646,060 B1* | 2/2014 | Ben Ayed | H04L 63/0853 726/9 |
| 8,701,169 B2 | 4/2014 | Campagna et al. | |
| 8,751,819 B1* | 6/2014 | Langsworth | H04L 9/0637 380/28 |
| 2005/0262361 A1* | 11/2005 | Thibadeau | G06F 21/80 713/193 |
| 2006/0050870 A1* | 3/2006 | Kimmel | H04L 63/0428 380/30 |
| 2006/0136713 A1* | 6/2006 | Zimmer | H04L 63/0428 713/150 |
| 2007/0078866 A1* | 4/2007 | Takashima | G06F 21/10 |
| 2007/0162978 A1* | 7/2007 | Watanabe | G06Q 20/3829 726/27 |
| 2007/0198277 A1* | 8/2007 | Philipp | G06Q 20/04 705/67 |
| 2008/0235809 A1* | 9/2008 | Weinstein | G06F 21/78 726/28 |
| 2008/0260147 A1* | 10/2008 | Shin | H04L 9/0637 380/46 |
| 2009/0121029 A1* | 5/2009 | Asnaashari | G06F 13/387 235/492 |
| 2009/0122989 A1* | 5/2009 | Asnaashari | G06F 21/77 380/278 |
| 2010/0019034 A1* | 1/2010 | Sherf | G06Q 20/1235 235/382 |
| 2010/0098256 A1* | 4/2010 | Kirshenbaum | H04L 9/14 380/277 |
| 2010/0235648 A1* | 9/2010 | Hoang | G06F 21/575 713/189 |
| 2010/0325443 A1* | 12/2010 | Mattsson | G06F 21/6218 713/189 |
| 2010/0333081 A1* | 12/2010 | Etchegoyen | G06F 8/60 717/172 |
| 2011/0119495 A1* | 5/2011 | Daoud | G06F 21/79 713/183 |
| 2012/0331287 A1* | 12/2012 | Bowman | H04L 9/3273 713/156 |
| 2013/0205370 A1* | 8/2013 | Kalgi | H04W 12/10 726/3 |
| 2013/0238499 A1* | 9/2013 | Hammad | G06Q 20/3227 705/44 |
| 2013/0305057 A1* | 11/2013 | Greco | G06F 21/80 713/189 |
| 2014/0282884 A1* | 9/2014 | Bao | G06F 21/31 726/4 |
| 2015/0295930 A1* | 10/2015 | Dixon | H04L 63/083 713/181 |

OTHER PUBLICATIONS

Kher V, Kim Y. Securing distributed storage: challenges, techniques, and systems. InProceedings of the 2005 ACM workshop on Storage security and survivability Nov. 11, 2005 (pp. 9-25). ACM.*

* cited by examiner

ONLINE VERIFICATION

OFFLINE VERIFICATION

DEVICE FUNCTIONALITY ACCESS CONTROL USING UNIQUE DEVICE CREDENTIALS

SUMMARY

Various embodiments of the present disclosure are generally directed to an apparatus and method for controlling access to protected functionality of a data storage device using unique credentials associated with the device.

In some embodiments, a plurality of identification (ID) values associated with a data storage device are combined to form a combined ID value. The combined ID value is processed using a secret symmetric encryption key to generate a unique device credential for the data storage device. The unique device credential is used as an input to a selected cryptographic function to control access to a protected function of the data storage device.

In further embodiments, a data storage device has a non-volatile main memory adapted to store user data from a host device, a local memory which stores an authentication value derived from a plurality of identification (ID) values associated with the data storage device, and a controller adapted to transfer the user data from the main memory to the host device. The controller has a protected function associated with the main memory. An access control module of the data storage device uses the authentication value as an input to a selected cryptographic function to control access to the protected function.

In further embodiments, a system includes a data storage device, a host device and an agent device. The data storage device has a data storage device having a controller, a main memory and a local memory. The host device generates a unique device credential for the data storage device by forming a combined identification (ID) value from a combination of a first set of individual ID values associated with the data storage device and by cryptographically processing the combined ID value using a secret encryption key. The host device forwards an authentication value to the data storage device for storage in the local memory responsive to the unique device credential. The agent device requests access to a protected function of the data storage device by obtaining a second set of individual ID values from the data storage device, forwarding input data responsive to the second set of individual ID values to a processing device, receiving output data from the processing device responsive to the input data, and forwarding the output data to the data storage device. The data storage device, in response to the output data from the agent device, uses the authentication value stored in the local memory as an input to a cryptographic function of the controller to authenticate the agent device and grant access to the protected function.

These and other features and advantages which may characterize various embodiments can be understood in view of the following detailed discussion and the accompanying drawings.

DETAILED DESCRIPTION

Figure 1:
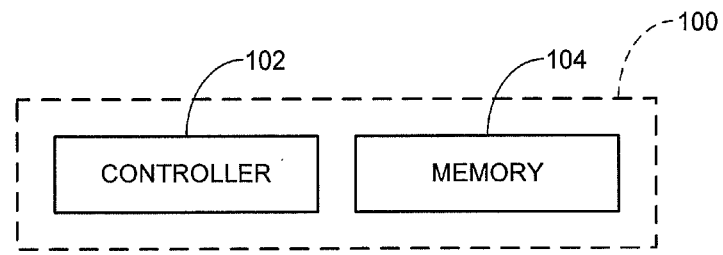
FIG. 1 provides a functional block representation of a data storage device in accordance with various embodiments of the present disclosure.

Various embodiments of the present disclosure are generally directed to controlling access to protected functionality of a data storage device.

Data storage devices store and retrieve user data in a fast and efficient manner. Data storage devices can take a variety of forms, but all generally tend to include some amount of computer memory. The memory may take a variety of forms such as optical or magnetic rotatable recording media (e.g., optical or magnetic discs), solid-state semiconductor-based memory (e.g., flash memory, STRAM, RRAM, MRAM, PCRAM, FeRAM, DRAM, SRAM), etc.

These and other forms of storage devices are often provided with protected functionality. The protected functionality is not normally available to a user of the storage device, but is configured to be accessible by an authorized agent such as an authorized service technician, OEM manufacturing representative, etc.

Protected functionality can take a variety of forms, such as diagnostic routines, factory settings, specially configured data stored on the device, device firmware and associated control information, security information and components, etc. In some cases, the protected functionality may include functional access to various sectors, blocks or memory devices within the storage device, including those available for use in storing user data.

It is generally important to control access to these and other types of protected functionality to prevent inadvertent and/or malicious tampering with the device. For example, an attacking party who gains access to the protected functionality of a device may be able to copy, modify and/or destroy files, install malware or otherwise degrade or destroy the ability of the user to use the storage device. Similarly, the owner of the device may inadvertently change certain settings, parameters, control information, etc. and thereby affect the ability to gain access to the contents of the device.

Storage device manufacturers have implemented a number of credential systems in an effort to protect such device functionality. In such schemes, some sort of credential (authorization) information is presented to the storage device in order to gain access to the protected functionality under consideration. While generally operable, these types of systems have been met with limited success.

One approach generally involves using the same credentials for all members of a population of devices. While relatively simple to implement, if the credentials were to become publicly known, all of the devices using those credentials could become compromised. Another approach has involved assigning each device a unique credential. While more secure, this approach generally requires maintenance of a relatively large database at the manufacturer or other secure site. This can become unwieldy for manufacturers that manufacture hundreds of thousands, if not millions, of data storage devices each day.

Another problem with existing functionality access control systems is the need to gain access to a secure server in order to carry out the authentication process necessary to gain access to the protected functionality. Sometimes it becomes necessary for forensic or problem resolution reasons to attempt access to the protected functionality on devices that are in remote geophysical locations where secure network (e.g., wireless, Internet, etc.) communications are not reliable, or even available at all.

Accordingly, various embodiments of the present disclosure are generally directed to a method and apparatus for controlling access to protected functionality of a data storage device.

As explained below, some embodiments generally involve identifying a number of identification (ID) information values associated with a data storage device. One or more of the ID information values is unique for the data storage device, although others may be common to (shared by) a population of similar storage devices. The ID information values are combined in such a way as to generate a unique credential value for the storage device. The unique credential value is thereafter used as an input to a cryptographic process to unlock protected functionality of the device.

The ID information values are concatenated to form a combined ID value, and the combined ID value is subjected to a symmetric encryption algorithm using a secret encryption key to generate the unique device credential. In some embodiments, the unique credential value is subjected to a hash algorithm to generate a hash ID value that is thereafter stored on the storage device. In other embodiments, the unique credential value is used as an input encryption key using a symmetric encryption algorithm.

To gain access to the protected functionality of the storage device, an authorized agent carries out an authentication operation that uses the unique credential value to verify to the device the agent has the right to access the functionality.

In this way, a unique set of credentials can be established for each of a population of nominally identical data storage devices without the need to establish a massive database to store such credentials. An attacking party that decodes the security system for a particular device cannot leverage the information gleaned from that success to access other devices. While secure servers can be accessed as part of the authentication process, such is not necessarily required. Finally, secret encryption keys that form a basis for the security system can remain undisclosed and inaccessible by attacking parties.

These and other features of various embodiments of the present disclosure can be understood beginning with a review of FIG. 1 which provides a functional block representation of an exemplary data storage device 100. The data storage device 100 is shown to include a controller 102 and a memory module 104.

The controller 102 provides top-level control of the device 100 and directs communications and data transfers with a host device (not separately shown in FIG. 1). The controller 102 may be realized in hardware, software and/or firmware. The memory module 104 can take a variety of forms, and includes one or more forms of data storage memory to store user data supplied by the host device.

Figure 2:
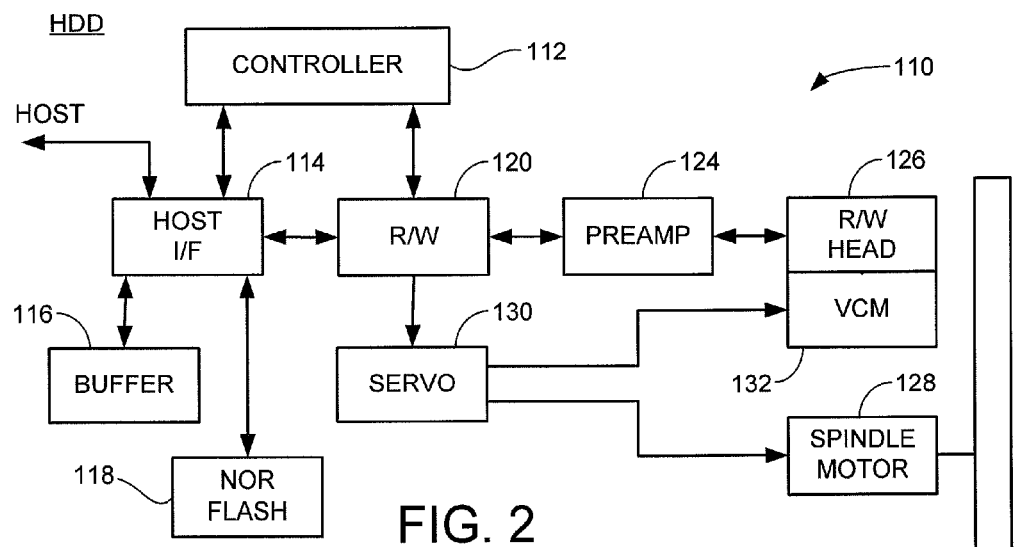
FIG. 2 is a functional block representation of the data storage device of FIG. 1 characterized as a hard disc drive (HDD).

FIG. 2 shows a data storage device 110 generally corresponding to the data storage device 100 of FIG. 1 in accordance with some embodiments. The data storage device 110 in FIG. 2 is characterized as a hard disc drive (HDD) that uses rotatable magnetic recording media to store user data from the host device.

The HDD 110 in FIG. 2 includes a hardware or firmware/software based controller 112 to provide top level control for the HDD. A host interface (I/F) 114 communicates commands, status information and user data during transfer operations between the HDD 110 and the host using a suitable interface protocol (such as Ethernet, SAS/SATA, etc.). A volatile and/or non-volatile buffer memory 116 facilitates the temporary storage of data, parameters and programming for use during such operations. Local memory in the form of NOR flash 118 can be provided to store certain control parameters used by the HDD 110 as explained below.

A read/write (R/W) channel 120 conditions write data supplied by the host for writing to rotatable magnetic recording media 122, and performs signal processing on recovered data signals during a read operation to reconstruct previously stored data. A preamplifier/driver (preamp) 124 supplies write currents, read bias currents and signal conditioning as required to one or more read/write (R/W) heads 126. The heads 126 are supported adjacent the data recording surfaces of the media 122 by air currents established by high speed rotation of the media via a spindle motor 128.

A closed loop servo positioning control circuit 130 obtains demodulated servo positioning information from the channel 120 and supplies control inputs to the spindle motor 128 and to a voice coil motor (VCM) 132. The VCM 132 pivots an actuator used to support the heads 126 to position the heads adjacent data tracks (not separately shown) defined on the media surfaces.

Figure 3:
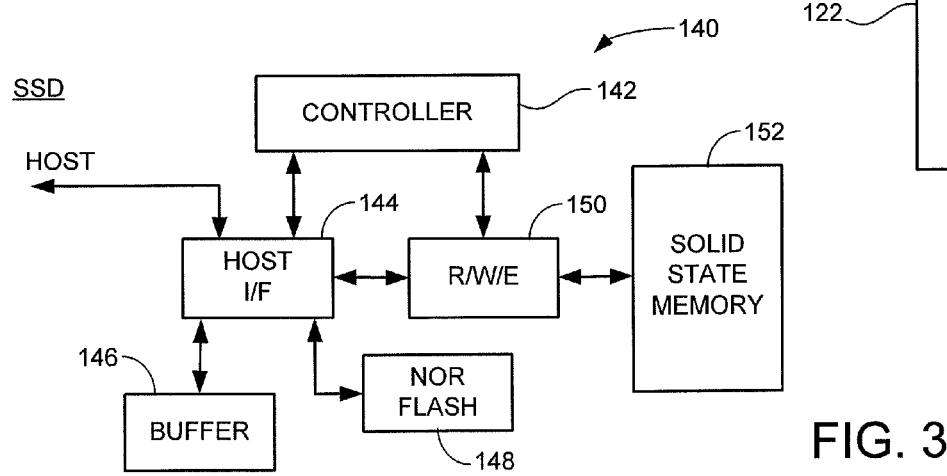
FIG. 3 is a functional block representation of the data storage device of FIG. 1 characterized as a solid-state drive (SSD).

FIG. 3 shows another data storage device 140 generally corresponding to the data storage device 100 of FIG. 1 in accordance with further embodiments. The data storage device 140 in FIG. 3 is characterized as a solid-state drive (SSD) that uses solid-state memory to store user data from the host device. The solid-state memory can take a variety of forms, including but not limited to electronically erasable memory such as flash memory and electrically erasable, electrically programmable random access memory (EEPROM) and rewriteable non-volatile memory such as STRAM, RRAM, MRAM, PCRAM, FeRAM, etc.

The SSD 140 as depicted in FIG. 3 includes a top level controller 142 which, as before, may be realized in hardware, software and/or firmware. A host I/F 144 communicates with the host using the same or different protocol as in FIG. 2. A buffer memory 146 provides local volatile and/or non-volatile memory during data transfer operations.

Local memory such as in the form of a NOR flash module 148 can be used for the storage of control data for the SSD 140. A read/write/erase (R/W/E) circuit 150 performs appropriate encoding/decoding operations during write and read operations to one or more solid state memory arrays 152.

It is contemplated that the data storage device 100, whether realized as an HDD as in FIG. 2, as an SSD as in FIG. 3, or in some other form, has certain protected functionality for which access control is provided to prevent inadvertent or malicious access thereto.

As mentioned above, the protected functionality is broadly defined as substantially any type of functionality of the storage device 100 for which access control is desired, including but not limited to diagnostic routines, factory settings, specially configured data stored on the device, device firmware and associated control information, security information and components, specially designated memory locations, etc. To this end, a security scheme is enacted for the data storage device 100.

Figure 4:
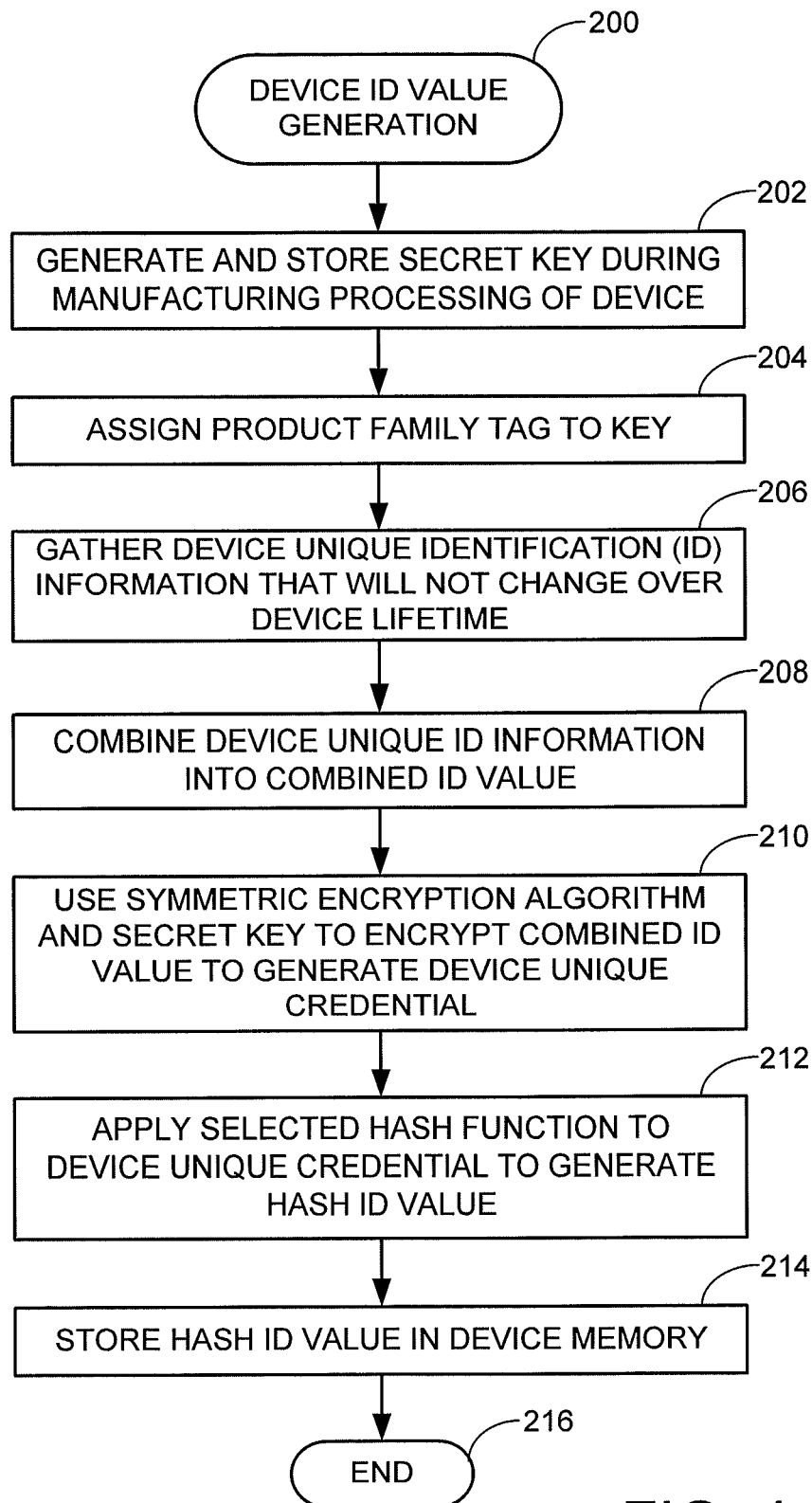
FIG. 4 is a flow chart for a device identification (ID) value generation routine illustrative of steps carried out in accordance with some embodiments to protect access to functionality of the storage device of FIG. 1.

FIG. 4 shows a device ID value generation routine 200 illustrative of some embodiments of the present disclosure. The routine 200 generally operates to generate a unique device credential that is different for, and unique to, each data storage device in a population of devices.

In the embodiment of FIG. 4, the unique device credential is subjected to a cryptographic function in the form of a hash function to generate a unique device ID value (hash ID value). The hash ID value is stored locally within the storage device 100 in a suitable memory location. Available memory locations for the unique device ID value include but are not limited to the main memory store (e.g., media 122 or solid state memory arrays 152), buffer memories (e.g., buffers 116, 146), local memories (e.g., NOR flash memory modules 118, 148), or other memory locations including erasable memory locations (e.g., STRAM, RRAM, PCRAM, MRAM, FeRAM, etc.), internal memory locations of various circuits such as the controllers 112, 142 or other system on chip (SOC) devices, etc.

It is contemplated albeit not necessarily required that the memory location be a "hidden" location; it is sufficient that the hash ID value be stored in a sufficiently secure location where it cannot be easily accessed or corrupted by an attacker. Additional layers of protection, such as key wraps, message digest values (e.g., HMAC authentication values, etc.) can be applied to the hash ID value as desired.

The routine 200 of FIG. 4 is contemplated as being carried out during manufacturing processing of the associated data storage device 100, although such is not necessarily limiting. The routine 200 commences with the generation and storage of a secret cryptographic key at step 202. The type and length of key will depend on the associated symmetric encryption algorithm (cipher) that is subsequently applied using the key as described below. At this point it will be appreciated that the key is selected using any number of well known random number generation techniques to provide a random sequence of bits as an input to the selected encryption process.

The selected key is next associated with a particular product family tag value at step 204. This is an optional step but it is contemplated that a single key will be assigned for use with a large population of different storage devices. This will enhance the efficiency and storage requirements of the present scheme. In one embodiment, all of the storage devices of a particular model number (or multiple model numbers) are associated with the selected key.

In other embodiments, certain revision levels of such devices are associated with the selected key. In still other embodiments, a predetermined population, such as X millions of devices with date codes or other identifying indicia, are associated as being related to the selected key. Any number of variations are contemplated, with the main point being that it should be relatively easy to subsequently identify which key is associated with a particular data storage device.

The routine 200 continues at step 206 where device unique identification (ID) information values are identified and collected for the particular data storage device under evaluation. The types and number of ID values can vary widely depending on the requirements of a given application. Generally, the ID values are of the type that will not tend to change during the operational lifetime of the storage device, and can therefore be recovered during subsequent processing as discussed below. Without limitation, such ID values can include device model number, device serial number, device capacity, individual component serial numbers (e.g., serial numbers applied to various individual components such as the preamp 124 and spindle motor 128 in FIG. 2, and to the solid state memory arrays 152 in FIG. 3), etc.

In further embodiments, the ID values can comprise parametric values identified and/or established during manufacturing of the device. For example, the ID values can include initial write or read current values supplied to various R/W heads 126 (FIG. 2), fly height adjustment values associated with the various heads, channel weight values used by the R/W channel 120 (FIG. 2), write and read current values or parameters used by the solid-state memory arrays 152 (FIG. 3), etc. In this latter case, such parameters may change over time but the values of such parameters are captured and stored locally within the device 100 such as but not limited to the NOR flash memory modules 118, 148 of FIGS. 2-3. One goal in the selection of appropriate ID values is the selection of values having significant amounts of entropy from a cryptographic standpoint, so essentially any suitable values that can be identified and recorded are encompassed in the ID values collected during step 206.

The device unique ID information values obtained during step 206 are thereafter combined at step 208 into a combined ID value. This can involve the simple concatenation of the various values in a selected order, or more complex combinatorial functions including but not limited to the application of exclusive-or (XOR) or other combinatorial functions to arrive at a final combined ID value.

Once the combined ID value is determined, the routine passes to step 210 where a selected symmetric encryption algorithm (cipher) is applied using the selected secret key upon the combined ID value to provide an encrypted ciphertext output (device unique credential). The device unique credential will be a multi-bit, apparently random sequence of bits of selected length. Any number of symmetric encryption algorithms can be applied including but not limited to encryption algorithms that use a cipher block chaining (CBC) mode, an XTS encryption (XOR/Encryption/XOR based encryption with ciphertext stealing) mode, etc.

The device unique credential is next subjected at step 212 to a selected hash algorithm to generate a hash ID value. The hash algorithm can take any number of suitable forms including secure hash algorithms (SHA) functions such as the SHA-256 function described by National Science and Technology (NIST) Federal Information Processing Standard (FIPS) 180-4. Other hash functions, including universal families of hash functions, can be used as desired, in which a random hash family selection value can be identified and stored to identify the associated hash function from the universal hash family.

The resulting hash ID value is thereafter stored in an appropriate device memory at step 214, and the routine ends at step 216.

Figure 5:
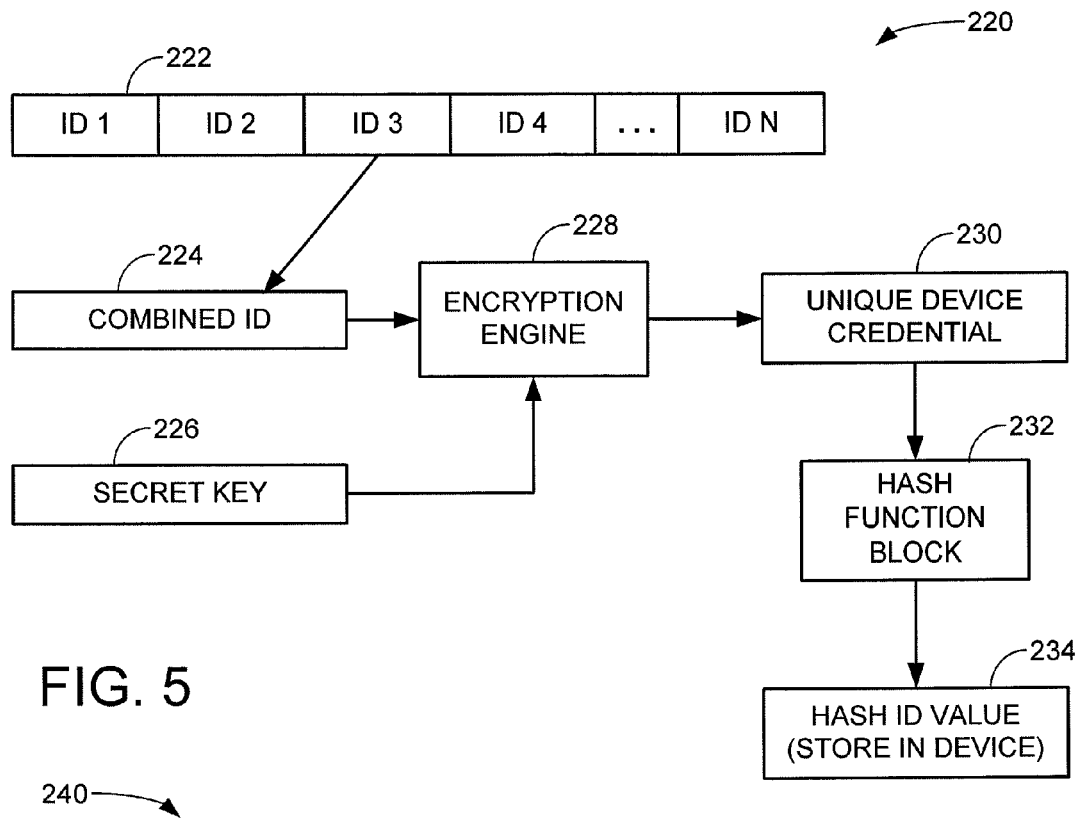
FIG. 5 is a functional block representation of processing circuitry used during the routine of FIG. 4.

FIG. 5 is a functional block diagram of a control circuit 220 that can be used to carry out the routine of FIG. 4. The control circuit 220 can be resident in one or more physical devices, including a host device coupled to the data storage device during manufacturing processing.

A number of identification (ID) values are collected from the data storage device under evaluation. These ID values are numerically designated at 222 and denoted as ID 1-N. The ID values 222 are concatenated in a selected order to form a combined ID value 224. Other combinatorial operations can be supplied to the ID values 222 to form the combined ID value 224 so long as the combinatorial operation(s) can be repeated later as explained below.

The combined ID value 224 is stored in a local memory and presented to an encryption engine 228 which, responsive to an input secret key 226, performs a selected symmetrical encryption operation on the input values to derive a unique device credential 230. The unique device credential 230 will be a multi-bit string of digital values having a random appearance, and is also temporarily stored in a local memory.

The unique device credential 230 is thereafter subjected to a hash function block 232 which applies a selected hash function as discussed above to generate an output hash ID value 234. The hash ID value 234 is stored in a suitable memory location within the data storage device 100 for future reference.

Figure 6:
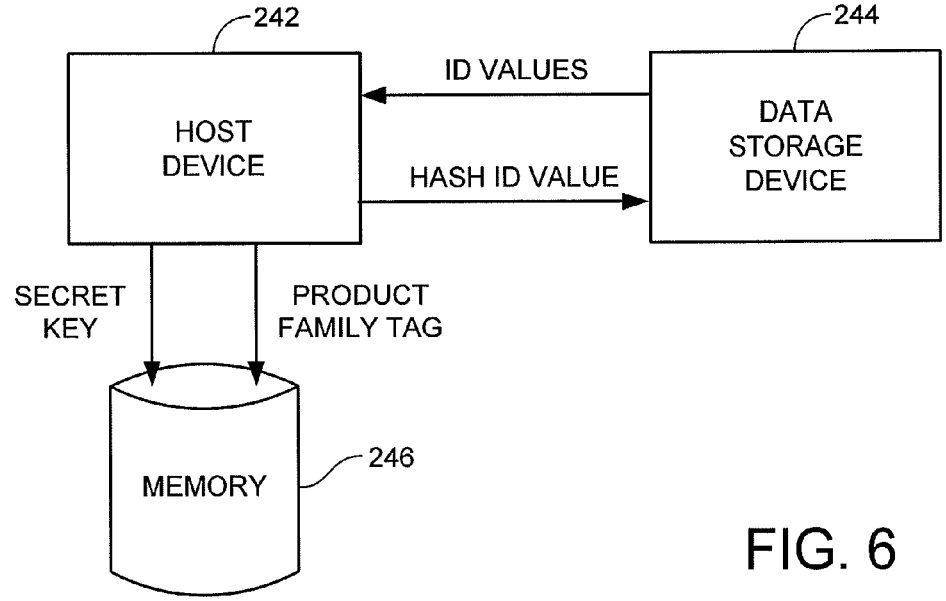
FIG. 6 depicts a data storage device undergoing processing in accordance with FIGS. 4 and 5.

FIG. 6 is a functional block diagram of a data processing system 240 that incorporates various elements of FIG. 5 to execute the routine of FIG. 4. It is contemplated that the data processing system 240 is operative during device manufacturing and evaluation testing, although such is merely exemplary and not necessarily limiting. The system 240 includes a host device 242, which may take the form of a computer or workstation with one or more programmable processors and associated memory, and a data storage device 244 subjected to various manufacturing processing.

As can be seen from FIG. 6, various ID values as supplied from the data storage device 244 to the host device 242. These ID values may be electronically transferred to the host device 242 responsive to a request for such data, or may be entered manually or semi-automatically using attendant personnel from a visual inspection of the device 244.

In the embodiment of FIG. 6, the host device 242 has associated programming to realize the various operational modules of FIG. 5 to generate the final hash ID value which is transferred to the data storage device 244 for storage therein. Certain control data, such as the secret key and the product family tag, are separately stored in local memory 246. These elements may be appended to a data structure, such as a table, allowing subsequent access as required.

Figure 7:
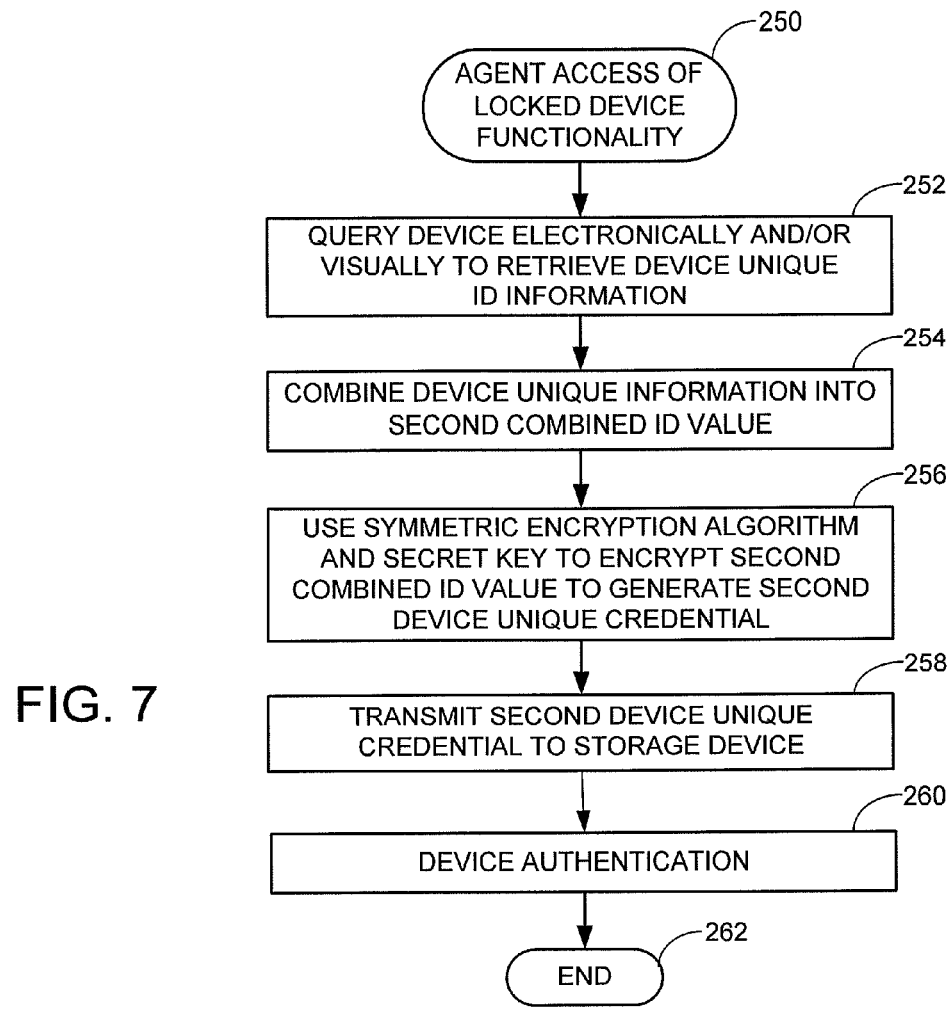
FIG. 7 is a flow chart for an agent access of locked device functionality routine illustrative of steps carried out in accordance with some embodiments to gain access to the protected functionality of the storage device of FIG. 1.

FIG. 7 provides a flow chart for an agent access of locked device functionality routine 250 that may be subsequently carried out during installation and/or field use of the data storage device 244 of FIG. 6. It is contemplated that the routine 250 is initiated by an authorized agent having authorization to access certain protected functionality of the device 244.

As set forth in FIG. 7, the routine begins with a query operation to gather the various device unique ID values (e.g., 222 in FIG. 5) from the data storage device 244. These ID values can be retrieved electronically such as through a communication pathway established with interface circuitry (e.g., 114, 144 in FIGS. 2-3) of the device which forwards the requested ID values responsive to a query request. Additionally or alternatively, some or all of the ID values may be retrieved through a visual inspection and manual entering of the ID values through a suitable user interface (not separately shown). For example, the authorized agent may visually inspect the device 244 to identify various ID values of interest and manually input those into an agent device. In some cases, the ID values may be in a machine readable form such as optical character recognition (OCR) characters or scannable barcodes (including two-dimensional barcodes) that can be sensed using suitable sensor equipment.

The routine proceeds to step 254 where the input ID values are combined to form a second combined ID value. It will be noted that the combinatorial function(s) applied to combine the individual ID values in the routine 200 of FIG. 4 are repeated at step 254 in FIG. 7.

The selected symmetric encryption algorithm and the secret encryption key from the routine 200 in FIG. 4 are applied at step 256 in FIG. 7 to the combined ID value to encrypt the same and generate a second device unique credential value. This second device unique credential value is transmitted to the storage device 244 at step 258, and the storage device performs an internal device authentication routine at step 260, details of which will be discussed shortly. The routine then ends at step 262.

Figure 8:
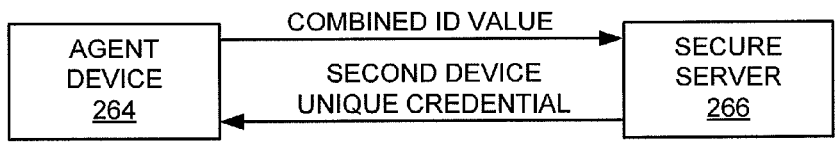
FIG. 8 is a functional block representation of processing circuitry used during the routine of FIG. 7 in an online verification mode.

The generation of the second device unique credential value by the authorized agent can be carried out in a variety of ways. As shown in FIG. 8, an online verification mode can be used in which an agent device 264, which may be in the form a portable network accessible device such as a laptop, a tablet, a smart phone, etc., establishes a secure connection with a remote secure server 266 over a suitable network (such as but not limited to the Internet).

In some embodiments, the agent device 264 communicates the combined ID value to the secure server 266, and the secure server carries out the necessary encryption processing to return the second device unique credential. An advantage of this approach is that the secret key (e.g., 226 in FIG. 5) remains under the control of the secure server and is not locally present on the agent device 264. The agent device 264 thereafter transmits the received second device unique credential to the data storage device 244.

Figure 9:
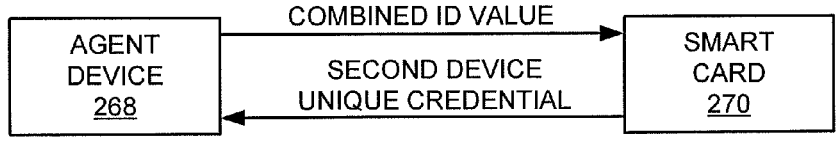
FIG. 9 is a functional block representation of processing circuitry used during the routine of FIG. 7 in an offline verification mode.

In other embodiments, an offline verification mode is used as set forth by FIG. 9. An agent device 268 obtains, via electronic and/or visual data collection methodologies, the various unique device ID values to generate the combined ID value. A separate smart card device 270, which may take a variety of forms including a secure portable USB thumb drive, etc., provides in a secured form the secret key and associated processing information to carry out the encryption processing of FIG. 7. The secret key may be wrapped using additional layers of cryptographic processing, including elements stored on the agent device 268, in order to carry out this processing.

Other additional security measures can be incorporated into the system, including additional security tokens or other elements that must be physically present and/or activated to activate the processing by the smart card 270. Regardless, it will be appreciated that the offline verification mode of FIG. 9 does not require a network connection to a remote server or other element in order to facilitate the authentication processing. As before, once the agent device 268 receives the second device unique credential, such is forwarded for processing by the data storage device in a manner to now be discussed with reference to FIG. 10.

Figure 10:
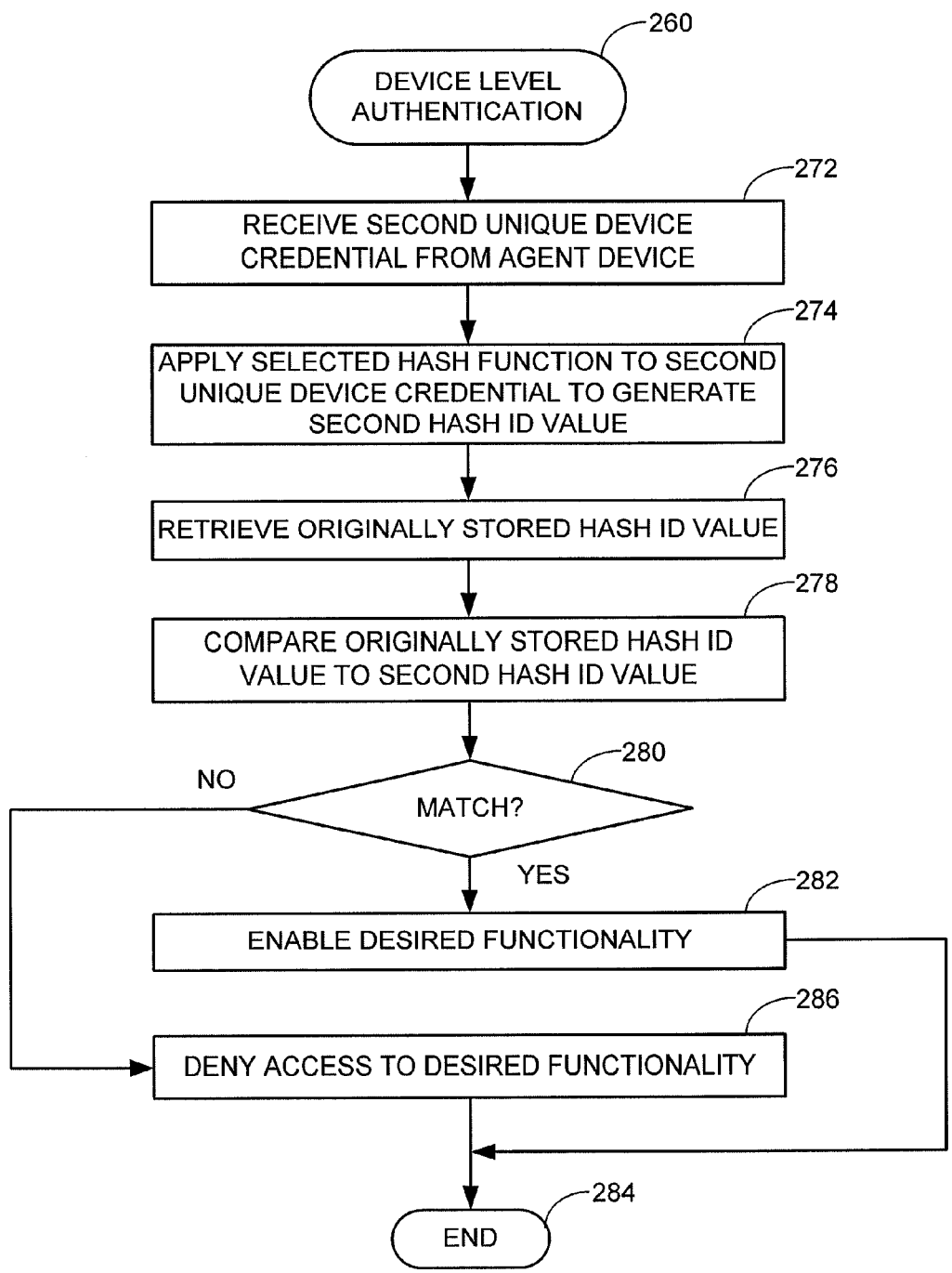
FIG. 10 is a device level authentication routine illustrative of steps carried out in accordance with some embodiments to authenticate the device and unlock the protected functionality.

FIG. 10 provides a flow chart for a device level authentication routine 260, corresponding to the block 260 set forth in the routine 250 of FIG. 7. It will be understood that the various steps carried out by the routine 260 are performed internally by the storage device 244, which reduces the ability of an unauthorized attacker to gain access to the various processing steps.

At step 272, the second unique device credential value is received from the associated agent device. At step 274, the selected hash function from FIG. 4 is applied to the received second unique device credential value to generate a second hash ID value. The originally stored hash ID value from FIG. 4 is retrieved from the associated memory at step 276, and compared to the second hash ID value at step 278.

If the respective hash ID values match, as indicated by decision step 280, the process continues to step 282 where the desired functionality is enabled and the routine ends at step 284. Contrawise, if the respective hash ID values do not match, access to the desired functionality is denied, as indicated by step 286. While the routine shows termination at step 284, other steps may be carried out at this point as well such as a re-entry of the various ID values, recalculation of the various device credential and hash ID values, etc.

Figure 11:
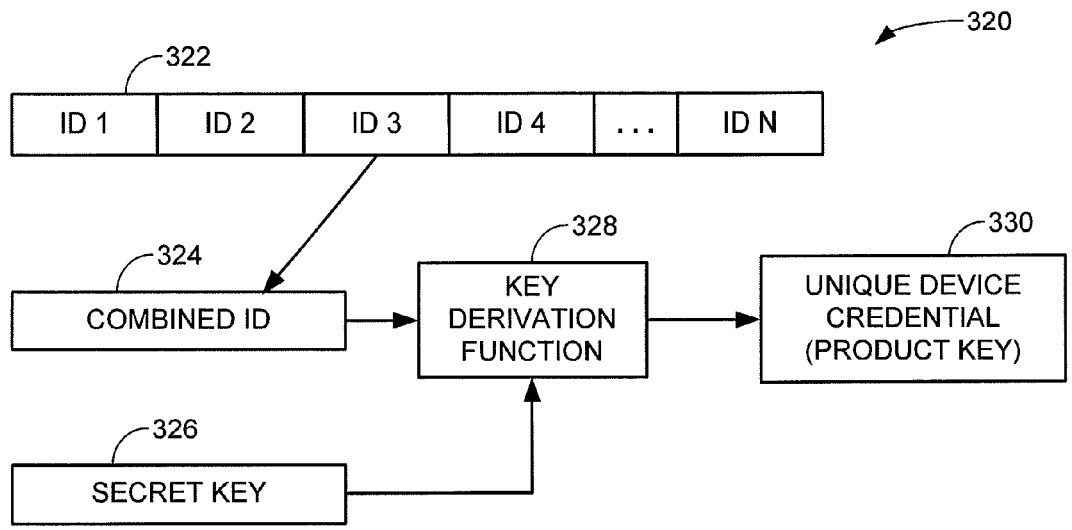
FIG. 11 shows processing circuitry used during an alternative authentication routine carried out in accordance with further embodiments to generate a unique device credential.

FIG. 11 illustrates a control circuit 320 that operates in accordance with alternative embodiments to generate a unique device credential for the data storage device 100. As before, the unique device credential is unique to, and different for, each data storage device in a population of such devices. As part of the security system, the unique device credential serves as an input to a cryptographic process used to control access to device functionality.

FIG. 11 is similar to FIG. 5 in that a number of individual device ID values 322, denoted as ID 1-N, are combined using a suitable combination process to form a combined ID value 324. The ID values 322 may be simply concatenated in a selected order, or more complex processing can be used including the use of interleaving, combinatorial functions (e.g., exclusive-or, XOR, etc.) to arrive at the combined ID value 324.

A secret symmetric encryption key 326 is utilized by a key derivation function (KDF) module 328 to form a unique device credential 330 as a unique product key. Any number of suitable cryptographic processes can be used by the engine 328 to derive the key, including an HMAC (hash based message authentication code) based function. Steps are taken to maintain the secret key 326 as confidential, such as through strict controls at the manufacturing site used to produce the data storage device 100.

Figure 12:
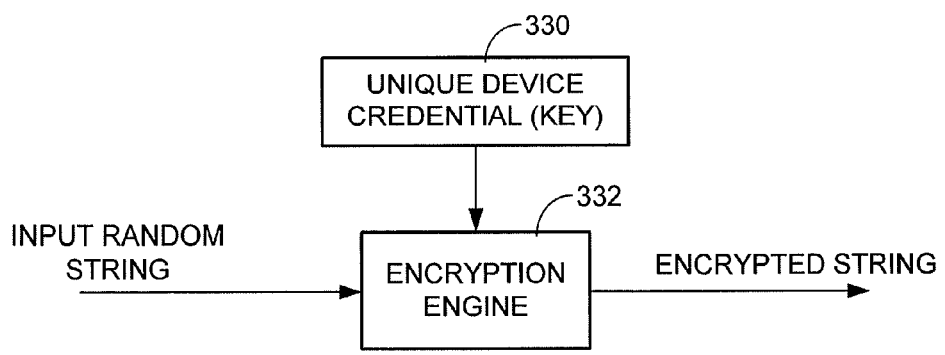
FIG. 12 illustrates the use of the unique device credential from FIG. 11 as an encryption key to encrypt input data.

The unique device credential 330 is thereafter used as a device unique product key in a cryptographic process, as generally shown in FIG. 12. The cryptographic process in FIG. 12 is an encryption algorithm of a second encryption engine 332, and the unique device credential 330 is used as a symmetric encryption key for the engine 332. The encryption engine 332 may be the same as, or different from, the encryption engine 328 of FIG. 12. The engine 332 transforms an input random string, which may be in the form of plaintext or previously encrypted ciphertext, into an encrypted (ciphertext) output.

Figure 13:
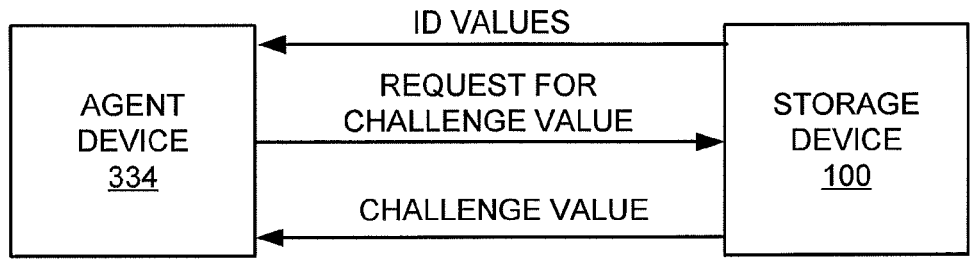
FIG. 13 shows an informational exchange between an agent device and the storage device of FIG. 1 in accordance with some embodiments.

FIG. 13 shows processing carried out by an agent device 334 of an authorized agent during authentication processing to gain access to protected functionality of the storage device 100. As before, the agent device 334 can take any number of processor-based devices which the agent uses to collect, via visual inspection and/or machine interrogation means, the various ID values (322 in FIG. 12) from the storage device 100.

In addition, the processing of FIG. 13 involves a request for a challenge value from the storage device 100. This request can take a variety of forms, and may be in the form of a specially configured data access command to the storage device 100 from the agent device 334 over an associated communication interface pathway. The storage device 100 forwards a challenge value to the agent device 334 in response to the data access command.

In some embodiments, the storage device 100 may be provided with one or more challenge values that have been precalculated and stored in a suitable memory location of the device, so that the request for a challenge value results in the outputting of the next available value from the device. Alternatively, the storage device 100 can be configured to generate a suitable challenge value on-the-fly responsive to the request from the agent device.

The challenge value can take any suitable form, but will be understood as comprising a multi-bit logical sequence of selected length. A random number generator or other circuitry, including circuitry that uses seed values, entropy values, etc. can be used to output the challenge value.

Figure 14:
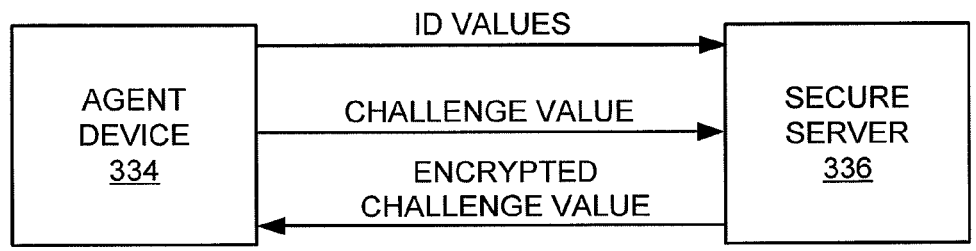
FIG. 14 shows an informational exchange between the agent device of FIG. 13 and a secure server in accordance with some embodiments.

As shown in FIG. 14, the agent device 334 proceeds to supply the ID values and the challenge value to a processing block. In FIG. 14, the processing block is depicted as a secure server 336 which is accessed via a network connection such as the Internet. Alternatively, the processing block may be a local device such as a smart card (see e.g., 270, FIG. 9) so that a network connection is not necessarily required.

Continuing with FIG. 14, the secure server 336 (or other processing block) uses the ID values to recreate the unique device credential (see FIG. 11) and to use the unique device credential to encrypt the challenge value (see FIG. 12). This produces an encrypted challenge value which is returned to the agent device 334. As before, the secret key (326, FIG. 11) and the encryption processing are maintained within the processing block so as to be unavailable to the agent device 334 or an unauthorized attacking party.

Figure 15:
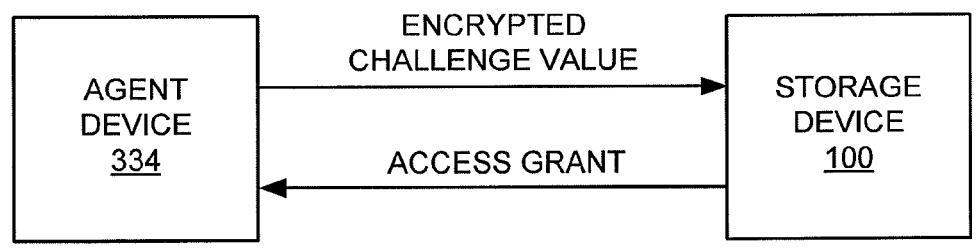
FIG. 15 shows another information exchange between the agent device of FIGS. 13-14 and the storage device in accordance with some embodiments.

As shown in FIG. 15, the agent device 334 returns to the storage device 100 and forwards the encrypted challenge value received from FIG. 14. The storage device 100 uses the locally stored unique device credential to decrypt the received encrypted challenge value to provide a recovered challenge value. If the recovered challenge value matches the original challenge value supplied to the agent device 334, the device authenticates the agent as an authorized agent and grants access to the desired protected functionality.

The foregoing processing of FIGS. 11-15 is similar to that of FIGS. 4-10 except that the unique device credential is used as an encryption key rather than as an input to a hash value. It will be appreciated that other schemes can be developed as well based on the present disclosure, including schemes that utilize aspects of both the embodiment(s) of FIGS. 4-10 and the embodiment(s) of FIGS. 11-15.

Figure 16:
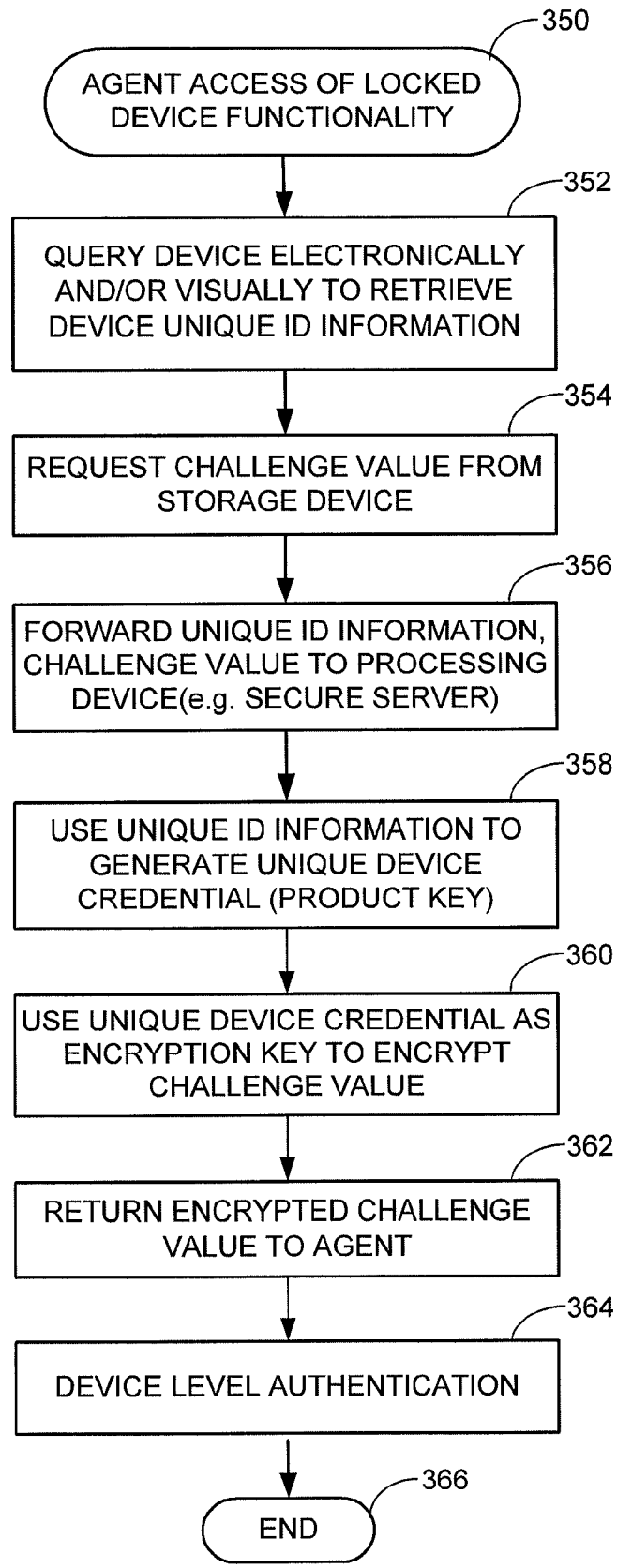
FIG. 16 is a flow chart for an agent access of locked device functionality routine in accordance with FIGS. 11-15.

FIG. 16 is a flow chart for an agent access of locked device functionality routine 350 to summarize the foregoing discussion. The various steps in FIG. 16 are merely exemplary and may be modified, omitted, appended, performed in a different order, etc.

At step 352, the process begins with a query by an agent device, such as the agent device 334 in FIG. 13, of the storage device 100 for the various ID values used by the security system. The query can be carried out visually and/or electronically. As before, the various ID values can include information printed on an external label or other surface of the device 100 such as model number, serial number, capacity, date codes, etc. and so readily available to an attacking party. The various ID values can also include hidden information stored within the device, including secret ID values, calculated values, parametric values measured by the device, etc. that are not normally readily available to an attacking party.

The agent device 334 continues at step 354 to request a challenge value from the storage device 100, as depicted in FIG. 13, and a suitable challenge value is forwarded or otherwise made available to the agent device.

At step 356, the challenge value and the various ID values are forwarded to a processing device such as the secure server 336 in FIG. 14. It is contemplated that the various ID values will be supplied in "raw" form rather than in the combined ID form of FIG. 11. That is, the agent device supplies the ID values, and the processing device combines the ID values internally in the correct order and in accordance with the appropriate combinatorial or other functions. This provides another level of protection in that the combined ID value remains hidden from an attacking party, and the actual mechanism used to form the combined ID value remains secret. However, in alternative embodiments, the combined ID processing is carried out by the agent device and the combined ID value is supplied to the processing device.

The processing device uses the ID values to generate the unique device credential at step 358 (unless this step has already been carried out by the agent device), and the unique device credential is used as an encryption key to encrypt the challenge value at step 360.

The resulting encrypted challenge value is returned to the agent device at step 362 and used during a device level authentication process 364, after which the process ends at step 366.

Figure 17:
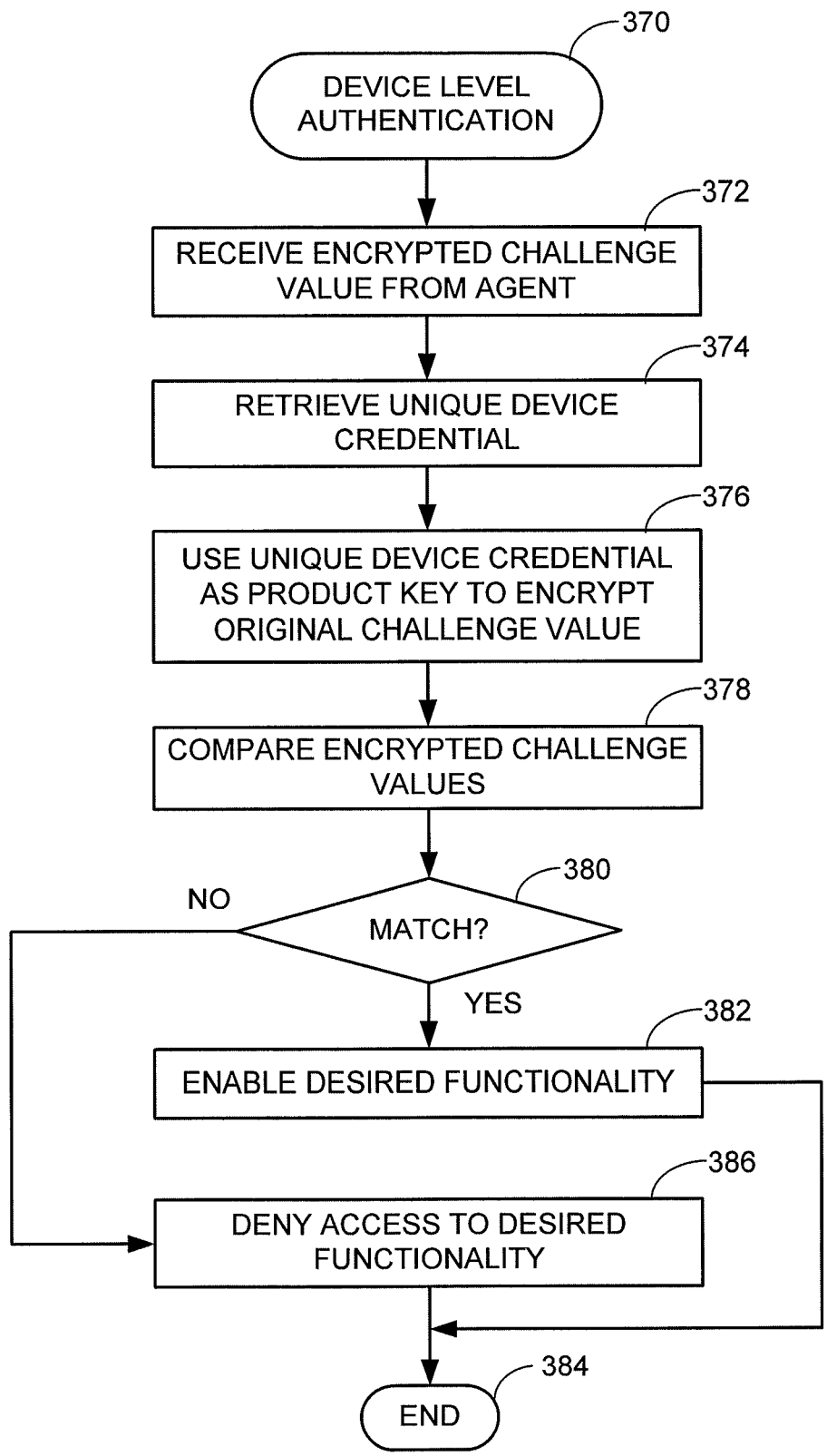
FIG. 17 is a flow chart for a device level authentication routine in accordance with the routine of FIG. 16.

The device level authentication processing of step 364 is represented in FIG. 17 by a device level authentication routine 370. The routine 370 is carried out internally by the data storage device 100.

The encrypted challenge value is received at step 372, and the previously stored unique device credential is retrieved at step 374. These elements are used at step 376 so that the unique device credential operates as a symmetric encryption key upon the originally issued challenge value to produce a second encrypted challenge value. The second encrypted challenge value is thereafter compared to the encrypted challenge value received from the agent device at step 378.

Alternatively, the unique device credential can be used to decrypt the received encrypted challenge value to produce a recovered challenge value which is compared to the originally issued challenge value. Regardless, if a match is obtained at decision step 380, the device proceeds to unlock the desired functionality at step 382, and the process ends at step 384. Alternatively, if a mis-match occurs, the routine passes from step 380 to step 386 where access is denied.

A variety of alternatives and additional considerations will readily occur to the skilled artisan in view of the present disclosure. Error detection codes (EDC) such as in the form of parity, checksums, Reed Solomon error correction codes (ECC), etc. can be used during the various data transmissions to ensure data bit integrity. The protected functionality can be substantially any desired functionality of the device including diagnostics, access to special secret data, ability to modify settings, install new firmware code, access to specific areas of the media including hidden folders, sectors, volumes, etc. The functionality access operations can form part of a bootstrap routine in which the device is initialized (such as through the use of external jumpers or internal switches) and enters a mode where the device can respond to the various inputs discussed herein.

It will be understood that the various embodiments disclosed herein can provide a number of benefits. A self-contained, highly secure control system is provided in which a unique device credential can be generated and used for each data storage device in a population of similar devices without the need to maintain a large database of such credentials. The credential for a given device can be quickly and reliably recreated on demand as required. Secret keys and other security elements can be maintained in a confidential and secure state without being accessible to an attacking party or process. Depending on the configuration of the system, device functionality can further be securely unlocked without necessarily requiring a network connection to an outside network.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. A computer-implemented method comprising:
  combining, using a host device, a plurality of identification (ID) values associated with a data storage device to form a first combined ID value, all of the ID values selected to remain unchanged over an operational life of the data storage device;
  encrypting, using the host device, the first combined ID value using a secret symmetric encryption key and a cryptographic process to generate a first unique device credential for the data storage device configured to remain unchanged over the operational life of the data storage device;
  transferring a first authentication value from the host device to the data storage device for storage of the first authentication value, by the data storage device, in a local memory of the data storage device, the authentication value generated by using the first unique device credential as an input to a selected cryptographic function;
  subsequently transferring the plurality of ID values from the data storage device to an agent device;

combining, using the agent device, the plurality of ID values to form a second combined ID value;

transferring a second unique device credential from the agent device to the data storage device, the second unique device credential formed by encrypting the second combined ID value using the secret symmetric encryption key and the cryptographic process used to generate the first unique device credential; and using the data storage device to generate a second authentication value by using the second unique device credential as an input to the selected cryptographic function and to grant access to a protected function of the data storage device responsive to the first and second authentication values.

2. The method of claim 1, wherein the cryptographic process is a selected hash function, the first data security value is a first hash ID value, the second data security value is a second hash ID value, and the method further comprises:

applying the selected hash function to the first unique device credential to generate the first hash ID value; and subsequently accessing the protected function of the data storage device by applying the selected hash function to the second unique device credential to generate the second hash ID value, and comparing the second hash ID value to the first hash ID value stored in the memory of the data storage device.

3. The method of claim 2, wherein the selected hash function comprises a secure hash algorithm (SHA) function.

4. The method of claim 2, wherein the selected hash function comprises a selected hash function from a universal family of hash functions.

5. The method of claim 1, wherein the cryptographic process is a key derivation function (KDF) and the method further comprises:

requesting a multi-bit challenge value from the data storage device;

using the second unique device credential as a product key to encrypt the multi-bit challenge value using a selected encryption algorithm to output an encrypted challenge value; and providing the encrypted challenge value to the data storage device.

6. The method of claim 5, wherein the data storage device authorizes access to the protected function by retrieving the first unique device credential from the memory of the data storage device, using the first unique device credential as an encryption key to encrypt the multi-bit challenge value to generate a second encrypted challenge value, and comparing the second encrypted challenge value to the encrypted challenge value provided to the data storage device.

7. The method of claim 5, wherein the data storage device authorizes access to the protected function by retrieving the first unique device credential from the memory of the data storage device, using the first unique device credential as decryption key to decrypt the encrypted challenge value provided to the data storage device to generate a second challenge value, and comparing the second challenge value to the challenge value requested from the data storage device.

8. The method of claim 1, wherein the data storage device is one of a population of nominally identical data storage devices each utilizing the same cryptographic process and cryptographic function.

9. The method of claim 1, wherein the plurality of unique ID values include at least a selected one of a model number, a serial number, a data capacity, a component serial number or a performance parameter of the data storage device.

10. The method of claim 1, wherein the agent device connected to the data storage device operates in an online verification mode in which the agent device obtains the ID values from the data storage device and communicates the same to a remote server over a network, in which the remote server returns a verification value to the agent device, and the agent device forwards the verification value to the agent device.

11. The method of claim 1, wherein the agent device connected to the data storage device operates in an offline verification mode in which the agent device obtains the ID values from the data storage device and communicates the same to a local smart card connected to the agent device, in which the smart card returns a verification value to the agent device, and the agent device forwards the verification value to the agent device.

12. A system comprising:

a data storage device having a controller circuit, a main memory and a local memory;

a host device which generates a first unique device credential for the data storage device by forming a combined identification (ID) value from a combination of a first set of individual ID values associated with the data storage device and by cryptographically processing the combined ID value using a secret encryption key, the host device configured to transfer a first authentication value to the data storage device for storage in the local memory responsive to the unique device credential, all of the ID values in the first set of individual ID values remaining constant over an operational lifetime of the data storage device; and an agent device which requests access to a protected function of the data storage device by obtaining a second set of individual ID values from the data storage device, forwarding input data responsive to the second set of individual ID values to a processing device, receiving output data from the processing device responsive to the input data, and forwarding the output data to the data storage device, the controller circuit of the data storage device, responsive to the output data, further configured to use the output data received from the agent device as an input to a cryptographic function of the controller to generate a second authentication value and to authenticate the agent device and grant access to the protected function responsive to the first and second authentication values.

13. The system of claim 12, wherein the first authentication value is a first hash value generated by the host device by applying a selected hash function to the unique device credential, the output data received from the processing device is a second unique device credential generated responsive to the second set of individual ID values, and the selected cryptographic function is the selected hash function so that the controller of the data storage device applies the selected hash function to the second unique device credential to form the second authentication value as a second hash value and compares the second hash value to the first hash value.

14. The system of claim 12, wherein the first authentication value is the first unique device credential, the input data is a challenge value forwarded to the agent device responsive to a request therefor from the data storage device, the output data is an encrypted challenge value generated by encrypting the forwarded challenge value, and the selected cryptographic function is an encryption algorithm so that the controller circuit encrypts/decrypts, using the first unique device credential, either the forwarded challenge value or the encrypted challenge value to authenticate the agent device.

15. The system of claim 12, wherein the combined identification (ID) value is formed by concatenating the first set of individual ID values associated with the data storage device in a predetermined order.

* * * * *